(12) United States Patent
Pratt

(10) Patent No.: US 8,691,919 B2
(45) Date of Patent: Apr. 8, 2014

(54) POLY(ETHYLENE OXIDE) FUNCTIONALIZATION

(75) Inventor: Russell Clayton Pratt, Foster City, CA (US)

(73) Assignee: Seeo, Inc., Hayward, CA (US)

( * ) Notice: Subject to any disclaimer, the term of this patent is extended or adjusted under 35 U.S.C. 154(b) by 0 days.

(21) Appl. No.: 13/251,246

(22) Filed: Oct. 1, 2011

(65) Prior Publication Data

US 2012/0083577 A1 Apr. 5, 2012

Related U.S. Application Data

(60) Provisional application No. 61/389,075, filed on Oct. 1, 2010.

(51) Int. Cl.
*C08G 65/32* (2006.01)

(52) U.S. Cl.
USPC ........... 525/408; 525/403; 528/405; 528/421; 528/486; 528/493; 528/496; 528/502 A

(58) Field of Classification Search
USPC ......... 510/475; 525/54.2, 398, 399, 400, 403, 525/408, 409, 410, 411, 437, 535, 539, 525/540; 548/545; 568/497; 528/405, 421, 528/486, 493, 496, 502 A
See application file for complete search history.

(56) References Cited

U.S. PATENT DOCUMENTS

| | | | |
|---|---|---|---|
| 6,916,962 B2 * | 7/2005 | Rosen et al. | 568/497 |
| 7,067,594 B2 | 6/2006 | Kolp | |
| 7,642,323 B2 * | 1/2010 | Bentley | 525/403 |
| 2003/0195136 A1 * | 10/2003 | Carswell et al. | 510/475 |
| 2004/0236015 A1 * | 11/2004 | Kozlowski et al. | 525/54.2 |
| 2005/0233473 A1 | 10/2005 | Cicero | |

OTHER PUBLICATIONS

Gravert et al. (Chem.Rev.1997,p. 489).*
Gravert et al. (Chem. Rev. 1997 p. 489.*
Hughes et al. (J. Phys.Chem. 1952 p. 927.*
Aldrich (4-DMAP MSDS).*
TCI (tetraethylammonium bromide, MSDS).*
Elizabeth R. Gillies, "Designing macromolecules for therapeutic applications: polyester dendrimer poly (ethylene oxide)"bow-tie" hybrids with tunable molecular weight and architecture," J. Am. Chem. Soc. 2002, 124, 14137-14146.
Xiao-Shuang Feng, "Toward an Easy Access to Dendrimer-like Poly-(ethylene oxide)s," J. Am. Chem. Soc. 2005, 127, 10956-10966.
Jenq-Thun Li, "Chemical modification of surface active poly (ethylene oxide)-poly (propylene oxide) triblock copolymers," Bioconjugate Chem. 1996, 7, 592-599.

* cited by examiner

*Primary Examiner* — Robert Jones, Jr.
(74) *Attorney, Agent, or Firm* — R'Sue Popowich Caron

(57) ABSTRACT

A simple procedure is provided by which the hydroxyl termini of poly(ethylene oxide) can be appended with functional groups to a useful extent by reaction and precipitation. The polymer is dissolved in warmed toluene, treated with an excess of organic base and somewhat less of an excess of a reactive acylating reagent, reacted for several hours, then precipitated in isopropanol so that the product can be isolated as a solid, and salt byproducts are washed away. This procedure enables functionalization of the polymer while not requiring laborious purification steps such as solvent-solvent extraction or dialysis to remove undesirable side products.

15 Claims, 1 Drawing Sheet

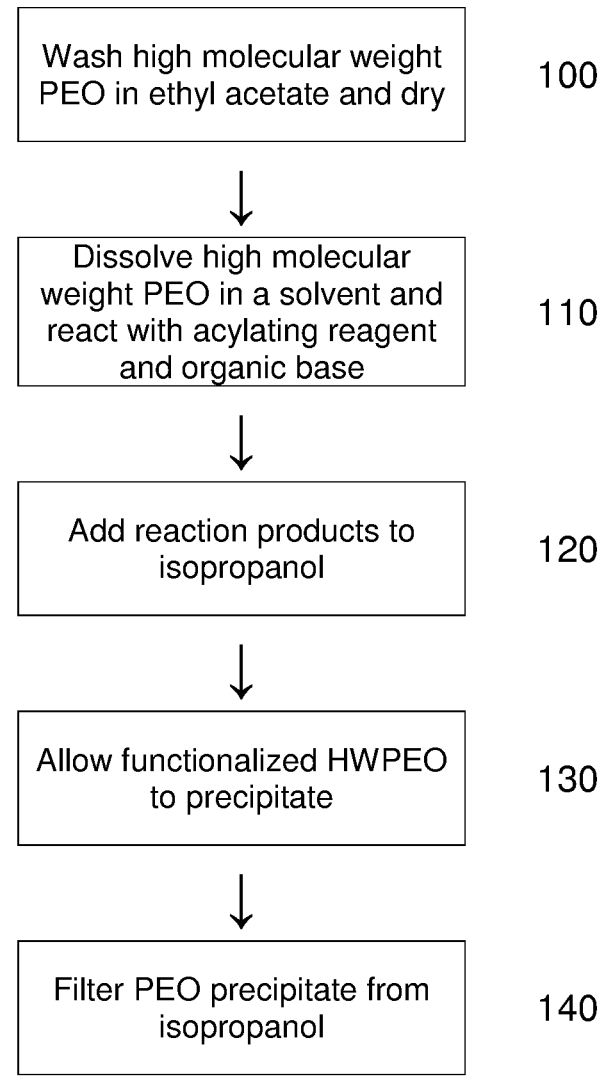

POLY(ETHYLENE OXIDE) FUNCTIONALIZATION

CROSS-REFERENCE TO RELATED APPLICATIONS

This application claims priority to U.S. Provisional Patent Application 61/389,075, filed Oct. 1, 2010, which is incorporated by reference herein.

STATEMENT OF GOVERNMENT SUPPORT

The invention described and claimed herein was made in part utilizing funds supplied by the U.S. Department of Energy under Contract No. DE-OE0000223. The Government has certain rights in this invention.

BACKGROUND OF THE INVENTION

Field of the Invention

This invention relates generally to a method of functionalizing high molecular weight polyethylene oxide.

Increased demand for lithium secondary batteries has resulted in research and development to improve their safety and performance. Many batteries employ liquid electrolytes and are associated with high degrees of volatility, flammability, and chemical reactivity. With this in mind, the idea of using a solid electrolyte with a lithium-based battery system has attracted great interest.

The lithium solid polymer electrolyte rechargeable battery is an especially attractive technology for Li-ion batteries because, among other benefits, the solid polymer electrolyte exhibits high thermal stability, low rates of self-discharge, stable operation over a wide range of environmental conditions, enhanced safety, flexibility in battery configuration, minimal environmental impacts, and low materials and processing costs. Moreover, solid polymer electrolytes may enable the use of lithium metal anodes and other high capacity anodes, which offer higher energy densities than traditional lithium ion anodes.

Despite their many advantages, the adoption of solid polymer electrolytes has been curbed by the inability to develop an electrolyte that exhibits both high ionic conductivity and good mechanical properties. This difficulty arises because according to standard mechanisms, high ionic conductivity calls for high polymer chain mobility. But high polymer chain mobility, according to standard mechanisms, tends to produce mechanically soft polymers.

As an example, a prototypical polymer electrolyte is a polyethylene oxide (PEO)/salt mixture. PEO generally offers good mechanical properties at room temperature. However, PEO is also largely crystalline at room temperature. The crystalline structure generally restricts chain mobility, reducing conductivity. Operating PEO electrolytes at high temperature (i.e., above the polymer's melting point) solves the conductivity problem by increasing chain mobility and therefore improving ionic conductivity. However, the increased conductivity comes at the cost of deterioration of the material's mechanical properties. At higher temperatures, the polymer is no longer rigid.

Block copolymers have been proposed as materials that can have both good mechanical properties and good conductivity. By using microphase-separated block copolymers of two or more carefully selected blocks, at least one block can impart mechanical integrity while at least one block can impart high conductivity. One example of such a material is a polystyrene/polyethylene oxide (PS/PEO) block copolymer. There is an optimum temperature range in which this block copolymer electrolyte exhibits good conductivity without sacrificing mechanical integrity. It would be useful to find a way to manufacture this block copolymer electrolyte material in large amounts, both economically and reproducibly, in order to assure its commercial viability.

SUMMARY

In one embodiment of the invention, a method for preparing functionalized, high molecular weight polyethylene oxide (HWPEO) is provided. The method involves reacting the HWPEO with an acylating reagent and an organic base. The mixture is then added to isopropanol, and the HWPEO is allowed to precipitate. The HWPEO is then filtered from the solvent. Various acylating reagents can be used in the reaction depending on the kind of functionalization desired.

BRIEF DESCRIPTION OF THE DRAWINGS

The foregoing aspects and others will be readily appreciated by the skilled artisan from the following description of illustrative embodiments when read in conjunction with the accompanying drawing.

FIG. 1 is a block diagram showing the novel steps in a HWPEO functionalization process according to an embodiment of the invention.

DETAILED DESCRIPTION

The embodiments of the invention are illustrated in the context of preparing high molecular weight PEO for subsequent reactions, such as formation of block copolymers. The materials and methods disclosed herein have application in a number of other contexts where functionalization of high molecular weight PEO is desirable, particularly where purity and simplicity are important.

The aforementioned needs are satisfied by the embodiments of the present invention which describe methods to functionalize high molecular weight PEO for subsequent reactions safely, with a minimum of process steps, using commonly available starting materials, at low cost, and with good reproducibility.

In one arrangement, the HWPEO has a molecular weight greater than about 50 kDa. In another arrangement, the HWPEO has a molecular weight greater than about 100 kDa. In yet another arrangement, the HWPEO has a molecular weight greater than about 200 kDa. In yet another arrangement, the HWPEO has a molecular weight greater than about 500 kDa.

In one embodiment of the invention hydroxyl end groups of high molecular weight poly(ethylene oxide) (HWPEO) are transformed into other functional groups. As the concentration of —OH (hydroxyl) groups in HWPEO is quite low, it is useful to choose an efficient reaction for transformation. One easy way to transform hydroxyl groups is by reaction with acylating reagents in the presence of an organic base to form an ester bond. This reaction, shown in scheme (1), is thermodynamically favorable and can proceed quantitatively at room temperature.

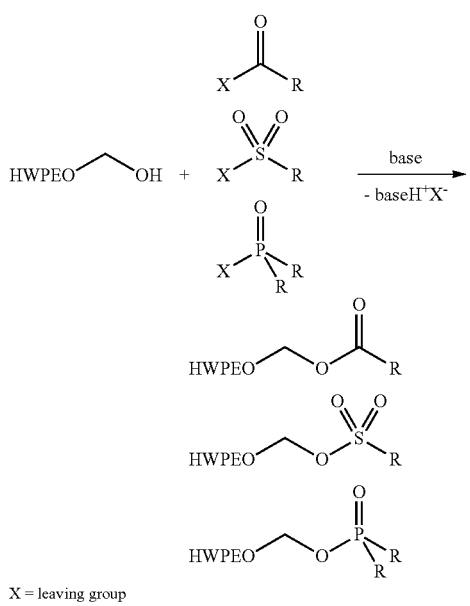

X = leaving group

Once the reaction is complete, the newly functionalized HWPEO is in a dissolved state and there are generally three reaction byproducts—unreacted acylating reagent, unreacted base, and a salt byproduct. It is useful to isolate pure functionalized HWPEO as a solid and free of such reaction byproducts.

When low molecular weight PEO is functionalized, the same undesirable byproducts are produced, but isolation and purification of such a low viscosity solution is straightforward. Purification can be accomplished by techniques such as filtration, solvent-solvent extraction, and dialysis. But these methods are not very useful for HWPEO: filtration is difficult for highly viscous solutions as are created when HWPEO is dissolved; HWPEO is a surfactant and can create an intractable emulsion if a solvent-solvent extraction is attempted; and dialysis is very slow and uses large amounts of solvent.

Typically non-polar solvents (e.g., hexane) are used as non-solvents for precipitation of polymers, but such solvents would cause the salt byproduct of reaction (1) to co-precipitate with the functionalized HWPEO, which is undesirable. We have found that after the functionalization reaction of HWPEO with acylating reagent and organic base, mixing the still-liquid crude reaction solution with isopropanol effectively causes precipitation of the desired functionalized HWPEO product. At the same time, the isopropanol dissolves any residual salts, acylating reagent, and organic base, thereby easily providing isolated and purified functionalized HWPEO in the precipitate. Furthermore, the functionalization reaction benefits because a large excess of the acylating and base reagents can be used to ensure that the reaction is not limited. Any unreacted remains can be removed easily later by the isopropanol precipitation steps.

In one embodiment of the invention, the PEO is rinsed with isopropanol and then with ethyl acetate before participating in reaction (1) above. The rinsing may help to remove water and low molecular weight contaminants which can adversely affect reaction (1) by reacting competitively with the acid halide and the organic base.

The steps of a method of functionalizing HWPEO, according to an embodiment of the invention, are shown in FIG. 1. In optional step 100, HWPEO is washed using a solvent that does not dissolve HWPEO and then dried. Examples of useful solvents for this step include ethyl acetate, isopropanol, and acetone. In some arrangements, the HWPEO can be washed multiple times with the same or various solvents. Vacuum drying can be used. This is especially useful if the HWPEO contains low molecular weight contaminants or moisture.

In step 110, HWPEO is dissolved and reacted with an acylating reagent and an organic base. Any solvent that is non-reactive with the acylating and basic reagents in reaction (1) can be used in this reaction. Examples of such solvents include, but are not limited to any one or more of benzene, anisole, acetonitrile, toluene, methylene chloride, chloroform, and xylene. The solubility of the HWPEO can be increased and the viscosity of the reaction mixture as a whole can be decreased by heating to temperatures of 50° C. or higher.

In one arrangement, the organic base is added to the HWPEO with the solvent. In another arrangement, the organic base is added to the HWPEO after it is dissolved in the solvent. In yet another arrangement, the acylating reagent is added to the mixture last.

Various acylating reagents can be used in the reaction depending on the kind of functionalization desired. In one arrangement, the acylating reagent includes a dye. In another arrangement, the acylating reagent includes a fluorescing group. In another arrangement, the acylating reagent includes an azido or acetylene group. In yet another arrangement, the acylating reagent includes a controlled radical polymerization initiator. In one embodiment of the invention, the acylating reagent is 2-bromoisobutyryl bromide. Examples of other acylating reagents that can be employed in the embodiments of the invention, either singly or in combination with others, include such compounds as alkyl chloroformates, acyl chlorides, acyl bromides, acid anydrides (linear or cyclic), acyl nitriles/cyanides, acyl azides, acyl imidazolates, acyl N-hydroxysuccinimidates, acyl 4-nitrophenolates, acyl pentafluorophenolates, sulfonyl chlorides/bromides, and phosphoryl chlorides/bromides. The reaction can be used to attach or introduce functional groups with additional utility, including reactive alkenes/olefins, alkynes, azides, aldehydes; disulfide groups, reducible to form thiols; initiators for radical polymerizations such as a-bromoesters or nitroxide groups; fluorescing groups such as dansyl, anthracene, pyrene; biochemical groups such as biotin for conjugation to biological molecules.

The following is a partial list of organic bases that can be used either singly or in combination in reaction (1), according to embodiments of the invention:

trialkylamines NR1R2R3, where R1, R2, R3 are independently chosen from C1-C8 straight-chain, branched-chain, or cyclic alkyl groups; also wherein 2 of R1, R2, and R3 are fused to form a 5-8 membered azacycloalkane;

peralkylated linear or cyclic polyamines, such as N,N,N', N'-tetralkylethylene-1,2-diamine, N,N,N',N'-tetralkylpropane-1,3-diamine, N,N,N,N',N'',N'''-pentaalkyldiaminetriamine, 1,4-dialkylpiperazine, and 1,4-diazabicyclo[2.2.2]octane, where the alkyl groups are independently chosen from C1-C6 straight-chain, branched-chain, or cyclic alkyl groups;

pyridine (C5H5N) and 2-alkyl, 3-alkyl, 4-alkyl, 2,3-dialkyl, 2,4-dialkyl, 2,5-dialkyl, 2,6-dialkyl, 3,4-dialkyl, 3,5-dialkyl, and 2,3,4-trialkyl, 2,3,5-trialkyl, 2,3,6-trialkyl, 2,4,5-trialkyl, 2,4,6-trialkyl, and 3,4,5-trialkyl substituted pyridines, where the alkyl groups are independently chosen from C1-C6 straight-chain, branched-chain, or cyclic alkyl groups;

N-alkyl, N,2-dialkyl, N,4-dialkyl, N,5-dialkyl, N,2,4-trialkyl, N,2,5-trialkyl, and N,2,4,5-tetraalkyl substituted imidazoles, where the alkyl groups are independently chosen from C1-C6 straight- and branched-chain alkyl groups;

N,N-dialkylanilines, where the alkyl groups are independently chosen from C1-C6 straight- and branched-chain alkyl groups; and amidines such as 1,8-diazabicyclo[5.4.0]undecene and 1,5-diazabicyclo[4.3.0]nonene.

In step 120, the reaction products are added to a solvent that does not dissolve HWPEO but does dissolve the reaction byproducts, such as isopropanol. In one arrangement, ethanol is used instead of isopropanol. In step 130, functionalized HWPEO is allowed to precipitate. In step 140, the purified and precipitated HWPEO is filtered from the solvent.

In one embodiment of the invention, an esterification catalyst such as DMAP (4-dimethylaminopyridine) can be added to the reagents in reaction (1) to accelerate the reaction. Such a catalyst is also soluble in isopropanol and other solvents, so it does not participate in the precipitation of the HWPEO after functionalization.

EXAMPLE

The following example provides details relating to functionalization of HWPEO in accordance with embodiments of present invention. It should be understood the following is representative only, and that the invention is not limited by the detail set forth in this example.

Commercially-obtained HWPEO (molecular weight about 100 kDa as determined by viscometry; 60 g, 0.6 mmol) was suspended in toluene (180 mL) and triethylamine (1.32 g, 13 mmol), and the resulting mixture was warmed to 65° C. until the HWPEO had dissolved. A solution of 2-bromoisobutyryl bromide (2.36 g, 10 mmol) in toluene (10 mL) was added, and the mixture was stirred for 18 hours at 65° C. The still-warm mixture was then poured into 2.25 L of stirring isopropanol to give a fibrous precipitate. The precipitate was isolated by filtration, immersed in 1 L fresh isopropanol, filtered again, and dried in vacuum to yield 55 g functionalized HWPEO.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A method for preparing functionalized high molecular weight polyethylene oxide (HWPEO), comprising the steps of:
   (a) dissolving the HWPEO in a first solvent and reacting the HWPEO with an organic base and an acylating reagent to form a mixture containing functionalized HWPEO, salt, unreacted organic base, and unreacted acylating reagent;
   (b) combining the mixture with isopropanol or ethanol;
   (c) allowing the functionalized HWPEO to precipitate while the salt, the unreacted organic base and the unreacted acylating reagent remain in a solution with the isopropanol or ethanol; and
   (d) filtering the functionalized, salt-free HWPEO from the solution.

2. The method of claim 1 wherein the HWPEO has a molecular weight greater than 50 kDa.

3. The method of claim 1 wherein the HWPEO has a molecular weight greater than 100 kDa.

4. The method of claim 1 wherein the HWPEO has a molecular weight greater than 200 kDa.

5. The method of claim 1 wherein the HWPEO has a molecular weight greater than 500 kDa.

6. The method of claim 1, further comprising, before step (a), an additional step of washing and then drying the HWPEO.

7. The method of claim 6 wherein the HWPEO is washed in one or more of ethyl acetate, acetone, and isopropanol.

8. The method of claim 1 wherein the first solvent is selected from the group consisting of isopropanol, benzene, anisole, acetonitrile, toluene, methylene chloride, chloroform, and xylene.

9. The method of claim 1 wherein the acylating reagent comprises a functional group selected from the group consisting of dyes, fluorescing groups, azido groups, acetylene groups, controlled radical polymerization initiators, reactive alkenes, aldehydes, and disulfide groups.

10. The method of claim 1 wherein the acylating reagent is selected from the group consisting of alkyl chloroformates, acyl chlorides, acyl bromides, acid anydrides, acyl nitriles, acyl cyanides, acyl azides, acyl imidazolates, acyl N-hydroxysuccinimidates, acyl 4-nitrophenolates, acyl pentafluorophenolates, sulfonyl chlorides, sulfonyl bromides, phosphoryl chlorides and phosphoryl bromides.

11. The method of claim 1 wherein the acylating reagent comprises 2-bromoisobutyryl bromide.

12. The method of claim 1 wherein the organic base is selected from the group consisting of triethylamine and tributylamine.

13. The method of claim 1 further comprising adding an esterification catalyst in step (a).

14. The method of claim 13 wherein the esterification catalyst comprises DMAP.

15. A method for preparing functionalized high molecular weight polyethylene oxide (HWPEO), comprising the steps of:
   (a) dissolving the HWPEO in a solvent and reacting with 2-bromoisobutyryl bromide and triethylamine to form a mixture containing functionalized HWPEO, salt, unreacted 2-bromoisobutyryl bromide and unreacted triethylamine;
   (b) combining the mixture with isopropanol;
   (c) allowing the functionalized HWPEO to precipitate while the salt, unreacted 2-bromoisobutyryl bromide and unreacted triethylamine remain in a solution with the isopropanol; and
   (d) filtering the functionalized, salt-free HWPEO from the solution.

* * * * *